(12) United States Patent
Halleck et al.

(10) Patent No.: US 7,376,789 B2
(45) Date of Patent: May 20, 2008

(54) WIDE-PORT CONTEXT CACHE APPARATUS, SYSTEMS, AND METHODS

(75) Inventors: William Halleck, Lancaster, MA (US); Pak-lung Seto, Shrewsbury, MA (US); Victor Lau, Marlboro, MA (US)

(73) Assignee: Intel Corporation, Santa Clara, CA (US)

( * ) Notice: Subject to any disclaimer, the term of this patent is extended or adjusted under 35 U.S.C. 154(b) by 304 days.

(21) Appl. No.: 11/171,960

(22) Filed: Jun. 29, 2005

(65) Prior Publication Data

US 2007/0005888 A1 Jan. 4, 2007

(51) Int. Cl.
*G06F 12/00* (2006.01)
(52) U.S. Cl. .................. 711/118; 711/135; 711/141; 711/142; 711/154
(58) Field of Classification Search ............... 711/118, 711/135, 141, 142, 143, 154
See application file for complete search history.

(56) References Cited

U.S. PATENT DOCUMENTS

2004/0205259 A1   10/2004   Galloway
2005/0102474 A1   5/2005    Lakshmanamurthy et al.
2006/0155944 A1*  7/2006    Kano .................. 711/161
2006/0294344 A1*  12/2006   Hsu et al. ............ 712/228
2007/0005898 A1   1/2007    Halleck et al.

FOREIGN PATENT DOCUMENTS

WO   WO-2007/002804 A2   1/2007
WO   WO-2007/002804 A3   1/2007

OTHER PUBLICATIONS

Gray, K., "Serial Attached SCSI : A Serial Interface for Enterprise Storage Systems", *Internet Citation*, (Jul. 31, 2003).

* cited by examiner

*Primary Examiner*—Kimberly McLean
(74) *Attorney, Agent, or Firm*—Schwegman, Lundberg & Woessner, P.A.

(57) ABSTRACT

Apparatus, systems, methods, and articles may operate to restrict an order of processing of frames associated with a task context stored in at least one context cache memory location. The order of processing may be restricted by selectively locking the context for exclusive use by a selected lane in a multi-lane serial-attached small computer system interface (SAS) hardware protocol engine while the selected lane processes a selected one of the frames.

26 Claims, 3 Drawing Sheets

WIDE-PORT CONTEXT CACHE APPARATUS, SYSTEMS, AND METHODS

TECHNICAL FIELD

Various embodiments described herein relate to digital communications generally, including apparatus, systems, and methods used to process frames in a serial-attached small computer system interface (SAS) device.

BACKGROUND INFORMATION

A serial-attached small computer system interface (SAS) protocol engine supporting a large number of outstanding input-output (I/O) tasks may require a large memory for maintaining I/O contexts associated with pending and in-process tasks. The term "I/O" may refer to a particular SAS device conversation. An I/O task context may comprise a set of parameters associated with the particular SAS device conversation, including link rate, device address, supported protocols, and status register contents, among others. As the size of the memory is increased a cost/performance trade-off may be required, particularly if the memory is accessed by multiple agents. A large, high-latency context memory accessed by both hardware and firmware resources may result. "Firmware" as used herein means processor cycles or processes from a host processor or from a general purpose processor located in the SAS device. "Hardware" refers to a hardware protocol engine located within the SAS device.

To reduce the penalty of accessing this memory, a design may implement local storage within a SAS transport layer to cache the I/O task context associated with a particular set of inbound or outbound frames. The task context can be read once from main memory and used multiple times without paying a read penalty again. A design implementing more than one lane may include a local cache for each lane accessible only by that lane. A data frame path between SAS devices may include device interfaces and may be referred to as a "lane." Additional information related to the SAS environment may be found in SAS standards documents, including e.g., Serial Attached SCSI, Version 1.1, Revision 09d, May 30, 2005; SAS-1.1).

In a SAS narrow-port configuration, data frames for a given I/O may arrive on a particular lane. In a SAS wide-port configuration, however, multiple lanes may be simultaneously connected to a target device and receive data frames for an I/O associated with the target device. In a technique sometimes referred to as "lane hopping," the data frames associated with the I/O may arrive on the multiple lanes.

In the wide-port lane-hopping case, a lane may be required to retrieve a task context associated with an I/O comprising a plurality of frames distributed across multiple lanes as the frames are processed in a sequential order of reception. The task context may be updated as each frame is processed, before a subsequent frame associated with the same I/O is processed. Because of the sequential nature of the frame processing, the task context must be migrated from lane to lane as the processing proceeds. Traditionally, this is done by flushing each lane's local context back to the main context memory, then reading it again from the next lane. This method adds significant read/write overhead to the frame processing operations.

DETAILED DESCRIPTION

Figure 1:
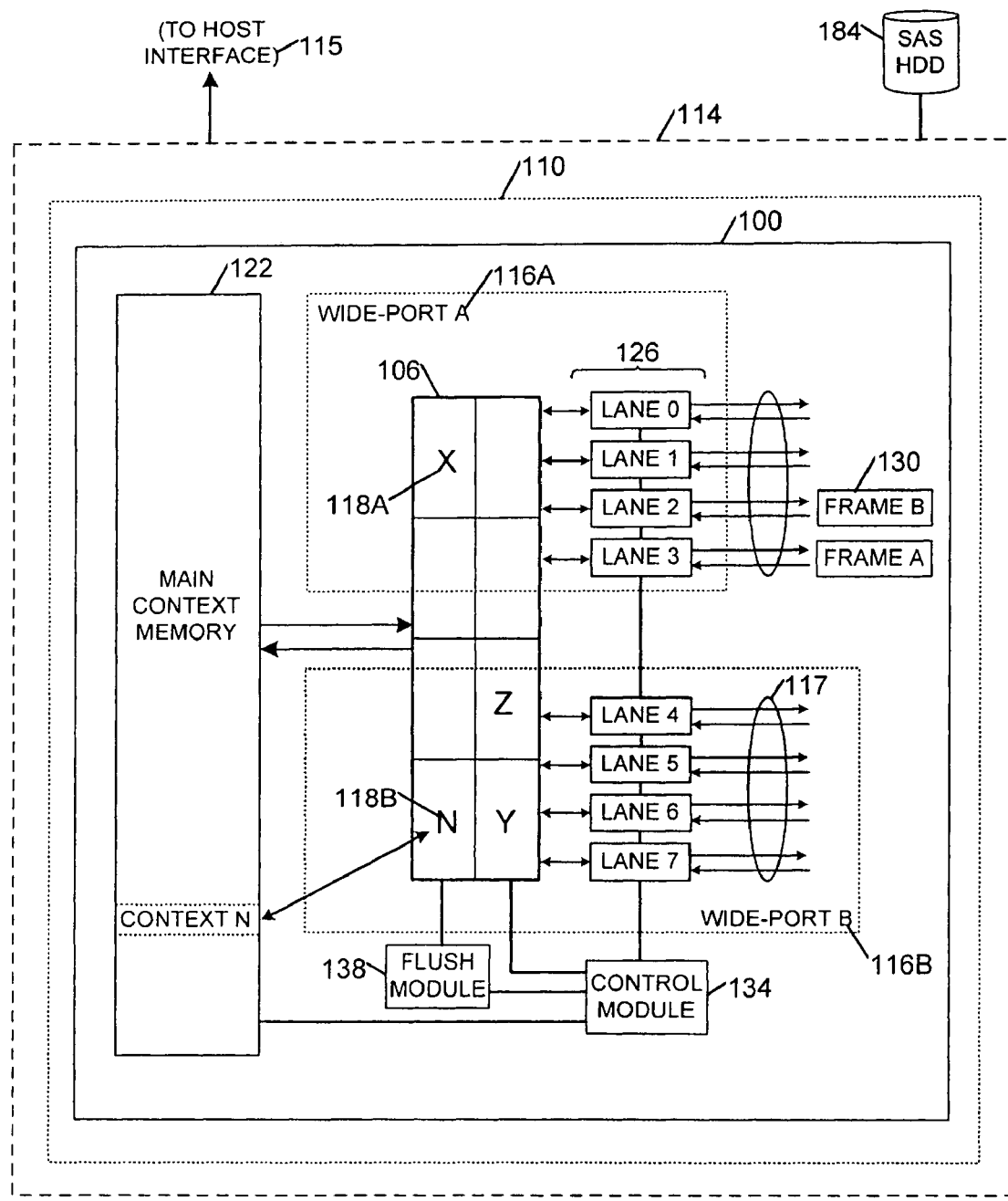
FIG. 1 is a block diagram of an apparatus and a representative system according to various embodiments of the invention.

FIG. 1 comprises a block diagram of an apparatus 100 and a system 180 according to various embodiments of the invention. In some embodiments, a shared context cache can be implemented that is accessible by the transport layers of all lanes within the wide-port. Each lane may read from or write to each entry in the cache, eliminating the need to flush context updates to the main context RAM when lane hopping forces other lanes to request the same context.

Since subsequent frames must be processed with updated task context values only, the cache may implement lock and release mechanisms to maintain lane-to-lane coherency. A lane requiring a task context may lock the context. The lock may prevent other lanes from accessing the context while the lane processes a frame at the head of the lane and performs associated context updates. The cache may force a lane attempting to read a locked context to wait until the lock is cleared. The context may be explicitly released once the frame is processed and the context is updated. The release operation may clear the lock attribute and may allow the next lane to read the context. Since the cache is shared, updated context information may be available to other lanes in the wide-port after a context is released.

Some embodiments may include a context flush mechanism to release context control to firmware when an I/O is completed or when an error occurs. The hardware may update the context with pertinent status, and then may initiate a context flush to force the context to be written to the main context memory before passing control to the firmware.

FIG. 1 illustrates an example of a 2×4 wide-port cache design, wherein two groups of four lanes each are supported by the cache. Some embodiments of the invention may include other cache organizational structures. When frame A is received at lane 3, the transport layer requests an associated context N from the wide-port context cache. A miss in the cache may require that transport layer 3 wait while the context is fetched from the main context memory and placed in the wide-port context cache. The lane 3 transport layer may then lock context N in the cache and begin processing frame A.

Assume that frame B, a continuation of the same I/O as frame A, is then received at lane 2. Since lane 2 also requires context N, the lane 2 transport layer requests context N from the wide-port context cache. Since lane 3 has locked context N, the lane 2 transport layer is forced to wait until context N is released. After processing frame A, the lane 3 transport layer updates appropriate context N fields in the wide-port context cache and explicitly releases context N. The lane 2 transport layer now locks context N and processes frame B. Upon determining that frame B is the final frame associated with the I/O, lane 2 posts status to firmware. That is, lane 2 updates context N and signals the wide-port context cache to release and flush context N. Context N is written back to the main context memory and the context N entry in the cache is invalidated.

The apparatus 100 may include a wide-port context cache memory 106 in a SAS hardware protocol engine 110 associated with a SAS device 114. The SAS device 114 may be coupled to a host interface 115. The context cache memory 106 may be organized as a P×Q array. P may correspond to a number of SAS wide-ports 116A, 116B associated with the SAS hardware protocol engine 110. Q may correspond to a number of lanes 117 associated with the wide-port 116B. Other context cache organizational structures may be possible. Two context cache memories may exist in the protocol engine 110, for example, each associated with one of the wide ports 1116A, 116B. Other design requirements that may be used to determine the organization and sizing of the context cache 106 may include a desired cache hit rate. The SAS device 114 may comprise an initiator device, a target device, or both. The initiator device may comprise a SAS host bus adapter, among other devices. The cache memory 106 may store one or more task context(s) 118A, 118B.

The apparatus 100 may also include a main context memory 122 coupled to the context cache memory 106. The main context memory 122 may supply the task context(s) 118A, 118B to the cache memory 106 in response to a cache-fill request. A plurality of lane transport modules 126 may be coupled to the context cache memory 106 to access and update the context cache memory 106 while processing a SAS frame 130. The SAS frame 130 may comprise a received frame or a frame to be transmitted.

The apparatus 100 may further include a control module 134 coupled to the plurality of lane transport modules 126. The control module 134 may operate to reserve one or more of context cache memory read operations, context cache memory write operations, and context cache memory flush operations to a single one of the plurality of lane transport modules 126. The apparatus 100 may also include a context cache memory flush module 138 to perform one or more of cache write-back operations, cache write-through operations, and flush operations at the direction of the SAS hardware protocol engine 110.

In another embodiment, a system 180 may include one or more of the apparatus 100, including a wide-port context cache memory 106, a main context memory 122, and a plurality of lane transport modules 126. These elements may be included in a SAS device 114. The SAS device 114 may comprise an initiator device or a target device including a mass storage device. The system 180 may further include one or more disk drive(s) 184 coupled to the SAS device 114 to transmit a SAS frame 130. The SAS device 114 may be coupled to a host interface 115, as previously mentioned. The host interface 115 may comprise one or more processors.

Any of the components previously described can be implemented in a number of ways, including embodiments in software. Thus, the apparatus 100; wide-port context cache memory 106; SAS hardware protocol engine 110; SAS device 114; host interface 115; SAS wide-ports 116A, 116B; number of lanes 117; task context(s) 118A, 118B; main context memory 122; lane transport modules 126; SAS frame 130; control module 134; flush module 138; system 180; and disk drives(s) 184 may all be characterized as "modules" herein.

The modules may include hardware circuitry, single or multi-processor circuits, memory circuits, software program modules and objects, firmware, and combinations thereof, as desired by the architect of the apparatus 100 and system 180 and as appropriate for particular implementations of various embodiments.

It should also be understood that the apparatus and systems of various embodiments can be used in applications other than multi-lane caching of wide-port contexts in a SAS environment. Thus, various embodiments of the invention are not to be so limited. The illustrations of apparatus 100 and system 180 are intended to provide a general understanding of the structure of various embodiments. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers, workstations, radios, video players, audio players (e.g., mp3 players), vehicles, and others. Some embodiments may include a number of methods.

Figure 2:
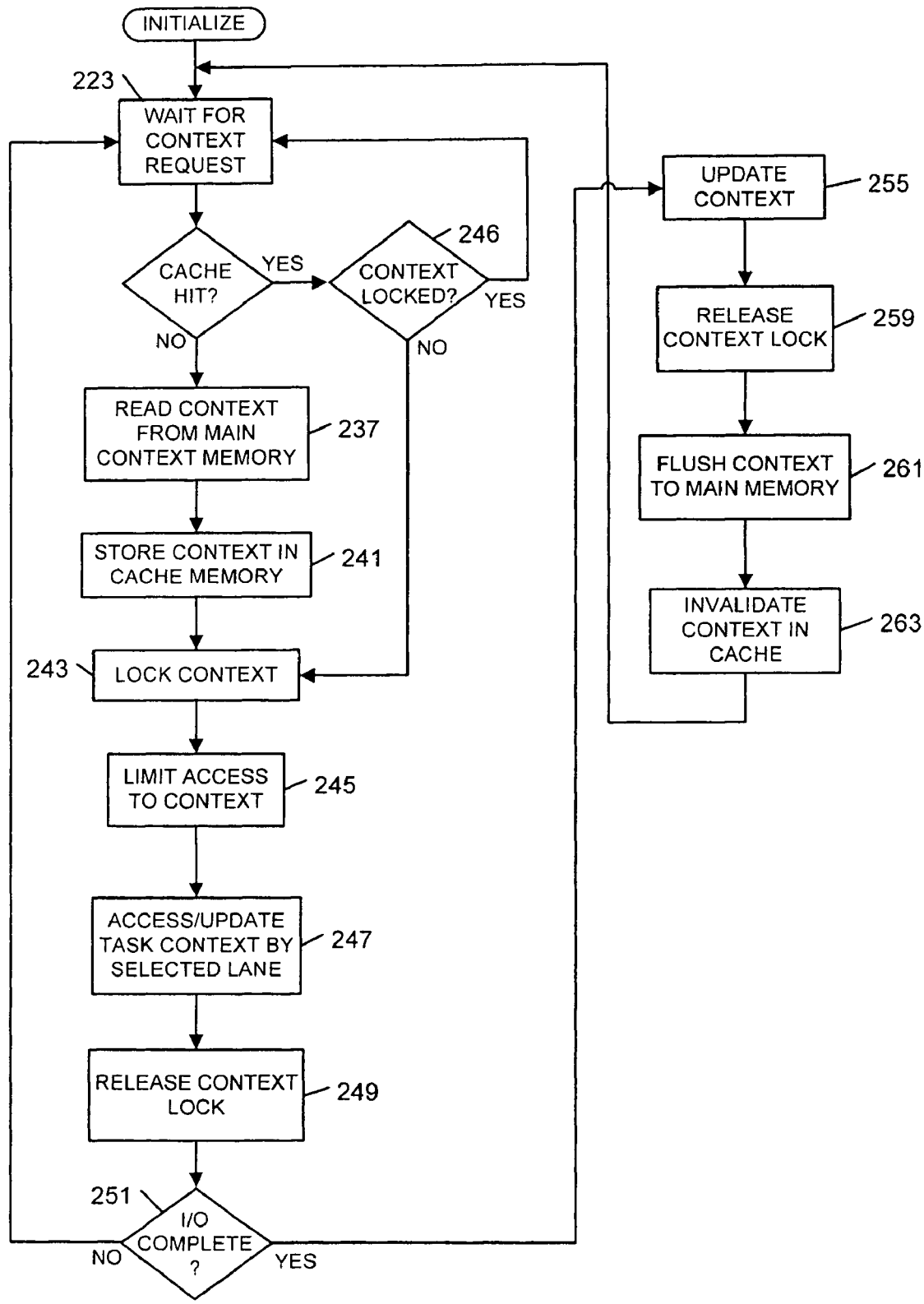
FIG. 2 is a flow diagram illustrating several methods according to various embodiments of the invention.

FIG. 2 is a flow diagram illustrating several methods according to various embodiments of the invention. The method 211 may include restricting an order of processing of frames associated with a task context in a multi-lane SAS hardware protocol engine. The order of processing may be restricted by selectively locking the context stored in one or more context cache memory location(s) while processing a selected frame. The locked context may thus be reserved for exclusive use by a selected lane in the multi-lane SAS hardware protocol engine while the selected lane processes a selected one of the frames. The cache memory location(s) may comprise a storage area within a wide-port context cache memory associated with a SAS device. The selected frame may comprise a received frame or a frame to be transmitted. In the received frame case, the order of processing may be restricted to an order of reception of the received frame. The context may be locked while processing the received frame as the frame arrives at a head of a selected lane.

A method 211 may include receiving the selected frame at the selected lane and requesting the task context from the context cache memory. The method 211 may thus include waiting for a context request, at block 223. The method 211 may also include reading the task context from a main context memory coupled to the context cache memory in response to a cache miss, at block 237. The method 211 may further include storing the task context in the context cache memory location(s), at block 241.

The method 211 may also include locking the task context, at block 243. The method 211 may thus include limiting access to task context read operations, cache context write operations, and cache context flush operations to the selected lane while the context is locked, at block 245. That is, access to the task context by a lane other than the selected lane or by processes other than a SAS hardware protocol engine process may be denied. The method 211 may further include waiting for a release of the task context by the selected lane, at block 246. Thus, a requesting lane that encounters a locked context may be required to continue requesting the context until released. The task context may be accessed and updated while processing the selected frame using the selected lane, at block 247. The method 211 may also include releasing the context lock, at block 249.

The method 211 may include determining that a final frame associated with the task context has been processed, at block 251, and with updating the task context upon receipt of the final frame, at block 255. The method 211 may continue at block 259 with releasing the task context from the locked condition, and at block 261 with flushing the task context to the main context memory. The method 211 may conclude with invalidating the task context in the context cache memory location(s), at block 263. Thus, the method 211 may include performing one or more of a cache write-back operation, a cache write-through operation, and a cache flush operation at the direction of the SAS hardware protocol engine, perhaps at the end of a task context processing cycle.

It may be possible to execute the activities described herein in an order other than the order described. And, various activities described with respect to the methods identified herein can be executed in repetitive, serial, or parallel fashion. Information including parameters, commands, operands, and other data can be sent and received in the form of one or more carrier waves.

One of ordinary skill in the art will understand the manner in which a software program can be launched from a computer-readable medium in a computer-based system to execute the functions defined in the software program. Various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
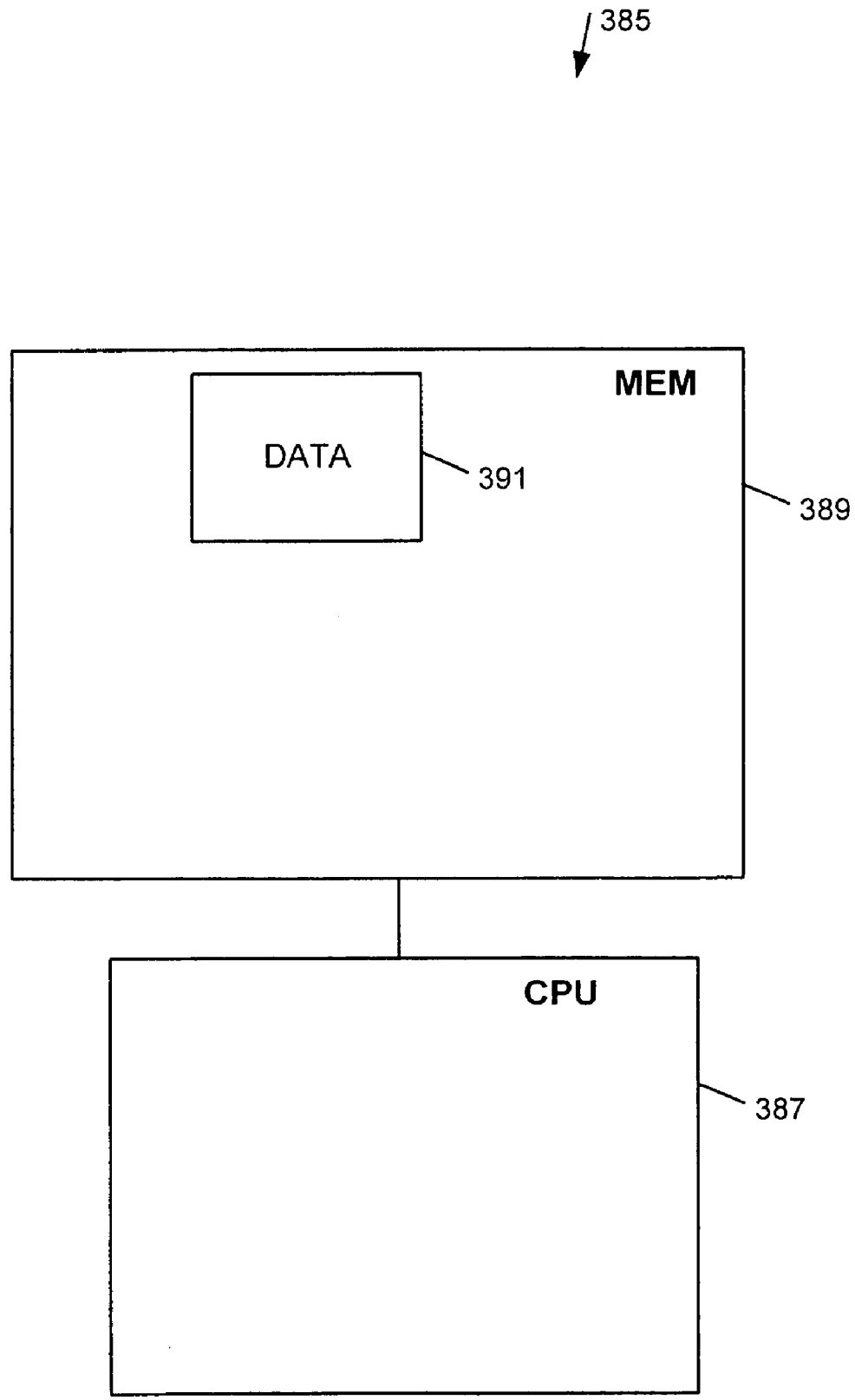
FIG. 3 is a block diagram of an article according to various embodiments of the invention.

FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) 387 coupled to a machine-accessible medium such as a memory 389 (e.g., a memory including electrical, optical, or electromagnetic elements). The medium may contain associated information 391 (e.g., computer program instructions, data, or both) which, when accessed, results in a machine (e.g., the processor(s) 387) restricting an order of processing of frames associated with a task context in a SAS hardware protocol engine, as previously described. Other activities may include denying access to the task context by (a) a lane other than the selected lane, by (b) processes other than a SAS hardware protocol engine process, or (c) by both.

Implementing the apparatus, systems, and methods disclosed herein may operate to cache task context values for access by a plurality of lanes in a multi-lane SAS device while sequencing frame processing according to an order of reception of the frames by selectively locking the cached context values.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, including:
    a wide-port context cache memory in a multi-lane serial-attached small computer system interface (SAS) hardware protocol engine associated with a SAS device to store at least one task context;
    a main context memory coupled to the context cache memory to supply the at least one task context in response to a cache-fill request; and
    a plurality of lane transport modules coupled to the context cache memory to access and update the context cache memory while processing a SAS frame.

2. The apparatus of claim 1, wherein the SAS device comprises at least one of an initiator device and a target device.

3. The apparatus of claim 2, wherein the initiator device comprises a SAS host bus adapter.

4. The apparatus of claim 1, further including:
    a control module coupled to the plurality of lane transport modules to reserve at least one of context cache memory read operations, context cache memory write operations, and context cache memory flush operations to a single one of the plurality of lane transport modules.

5. The apparatus of claim 1, further including:
    a context cache memory flush module coupled to the control module to perform at least one of cache write-back operations, cache write-through operations, and flush operations at the direction of the SAS hardware protocol engine.

6. The apparatus of claim 1, wherein the context cache memory is organized as a P×Q array, P corresponding to a number of SAS wide-ports associated with the SAS hardware protocol engine and Q corresponding to a number of lanes associated with a wide-port.

7. A system, including:
  a wide-port context cache memory in a multi-lane serial-attached small computer system interface (SAS) hardware protocol engine associated with a SAS device to store at least one task context;
  a main context memory coupled to the context cache memory to supply the at least one task context in response to a cache-fill request;
  a plurality of lane transport modules coupled to the context cache memory to access and update the context cache memory while processing a SAS frame; and
  at least one disk drive coupled to the SAS device to transmit the SAS frame.

8. The system of claim 7, wherein the SAS device comprises at least one of an initiator device and a target device.

9. The system of claim 7, wherein the target device comprises a mass storage device.

10. A method, including:
  restricting an order of processing of frames associated with a task context stored in at least one context cache memory location by selectively locking the context for exclusive use by a selected lane in a multi-lane serial-attached small computer system interface (SAS) hardware protocol engine while the selected lane processes a selected one of the frames.

11. The method of claim 10, wherein the at least one context cache memory location comprises a storage area within a wide-port context cache memory associated with a SAS device.

12. The method of claim 11, further including:
  receiving the selected frame at the selected lane.

13. The method of claim 11, further including:
  requesting the task context from the context cache memory.

14. The method of claim 11, further including:
  reading the task context from a main context memory coupled to the context cache memory in response to a cache miss.

15. The method of claim 11, further including:
  storing the task context in the at least one context cache memory location.

16. The method of claim 11, further including:
  limiting access to at least one of context cache memory read operations, context cache memory write operations, and context cache memory flush operations to the selected lane while the context is locked.

17. The method of claim 16, further including:
  accessing and updating the task context while processing the selected frame using the selected lane.

18. The method of claim 17, further including:
  requesting the task context from the at least one context cache memory location; and
  waiting for a release of the task context by the selected lane.

19. The method of claim 17, further including:
  determining that a final frame associated with the task context has been processed;
  updating the task context upon receipt of the final frame;
  releasing the task context from the locked condition;
  flushing the task context to the main context memory; and
  invalidating the task context in the at least one context cache memory location.

20. The method of claim 10, further including:
  performing at least one of a cache write-back operation, a cache write-through operation, and a cache flush operation at the direction of the SAS hardware protocol engine.

21. An article including a machine-accessible medium having associated information, wherein the information, when accessed, results in a machine performing:
  restricting an order of processing of frames associated with a task context stored in at least one context cache memory location by selectively locking the context for exclusive use by a selected lane in a multi-lane serial-attached small computer system interface (SAS) hardware protocol engine while the selected lane processes a selected one of the frames.

22. The article of claim 21, wherein the information, when accessed, results in a machine performing:
  denying access to the task context by a lane other than the selected lane; and
  denying access to the task context by processes other than a SAS hardware protocol engine process.

23. The article of claim 21, wherein the selected frame comprises a received frame located at a head of the selected lane.

24. An apparatus, including:
  a wide-port context cache memory in a multi-lane hardware protocol engine associated with a SAS device to store at least one task context;
  a main context memory coupled to the context cache memory to supply the at least one task context in response to a cache-fill request; and
  a plurality of lane transport modules coupled to the context cache memory to access and update the context cache memory while processing a communication frame.

25. The apparatus of claim 24, wherein the multi-lane hardware protocol engine comprises a serial-attached small computer system interface (SAS) hardware protocol engine associated with a SAS device, and wherein the communication frame comprises a SAS frame.

26. The apparatus of claim 24, further including:
  a control module coupled to the plurality of lane transport modules to reserve at least one of context cache memory read operations, context cache memory write operations, and context cache memory flush operations to a single one of the plurality of lane transport modules.

* * * * *

UNITED STATES PATENT AND TRADEMARK OFFICE
CERTIFICATE OF CORRECTION

PATENT NO. : 7,376,789 B2  Page 1 of 1
APPLICATION NO. : 11/171960
DATED : May 20, 2008
INVENTOR(S) : Halleck et al.

It is certified that error appears in the above-identified patent and that said Letters Patent is hereby corrected as shown below:

In column 7, line 17, in Claim 9, delete "claim 7," and insert -- claim 8, --, therefor.

Signed and Sealed this

Sixteenth Day of September, 2008

JON W. DUDAS
*Director of the United States Patent and Trademark Office*